(No Model.)
A. S. NEWBY.
DAMPER.
No. 246,808. Patented Sept. 6, 1881.
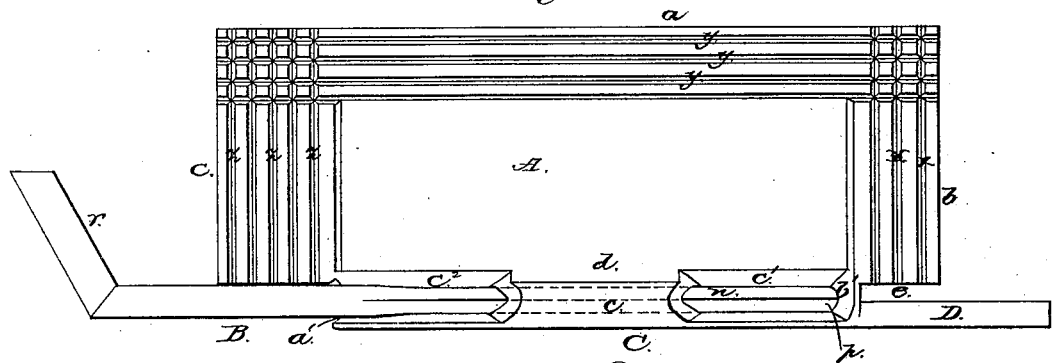
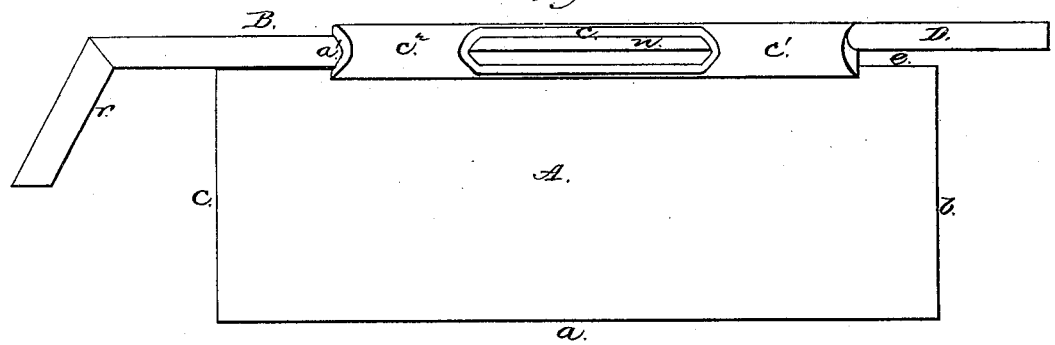
WITNESSES
John N. Ellis.
Philip C. Masi.
INVENTOR
A. S. Newby
by Anderson & Smith
his ATTORNEYS

UNITED STATES PATENT OFFICE.

ALBERT S. NEWBY, OF CHAMPAIGN, ILLINOIS.

DAMPER.

SPECIFICATION forming part of Letters Patent No. 246,808, dated September 6, 1881.

Application filed April 9, 1881. (No model.)

*To all whom it may concern:*

Be it known that I, ALBERT S. NEWBY, a citizen of the United States, residing at Champaign, in the county of Champaign and State of Illinois, have invented certain new and useful Improvements in Dampers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a view of one side of the damper, and Fig. 2 of the other side.

This invention relates to improvements in dampers.

The object of the invention is to produce a damper which can be readily adapted to various sizes of pipe or for use as a back damper in stoves.

The invention consists in a damper of peculiar construction, as hereinafter set forth.

In the annexed drawings, A is a damper-plate; B, the handle.

The plate A is made in any suitable shape, and should have a size adapted to that of the largest pipe. Along three of its edges, $a\ b\ c$, this plate is provided with grooves $x\ y\ z$, the body of the plate inside the innermost grooves being of a size to suit the smallest pipe. When the plate is made circular the grooves will extend around about three-fourths of its circumference. C is a projection upon the fourth edge, $d$, of this plate, extending beyond the line of the grooves $x$ and $z$ at the edges $b\ c$, being about the length of the body of the plate. At one end the projection has extending out from it the journal D, passing beyond the edge $b$, there being a space, $e$, between. This projection C has the three grooves $c\ c'\ c^2$, two on one side and one on the other, the last, $c^2$, being open at the outer end, $a'$, and the outer end, $b'$, of the groove $c'$ being beveled downward and inwardly.

The handle B has an operating-arm, $r$, and an angular stem, $n$, the inner end, $p$, of said stem being beveled off to suit the end $b'$ of the groove $c'$.

The plate A can be made to fit any size of pipe by breaking off its extreme edges, the grooves being made for that purpose. The journal D is slipped into one of the holes in the pipe, and the stem $n$ is run into place and sprung in by being jammed up against the bevel. When a handle breaks it can readily be replaced without removing the plate.

I claim—

A stove-pipe damper provided with a series of grooves at its edges, as set forth, whereby the removal of the outer portions is facilitated, so that the damper can be adapted to different sizes of pipe.

In testimony whereof I affix my signature in presence of two witnesses.

ALBERT S. NEWBY.

Witnesses:
J. MUSMAN,
S. T. LOW.